United States Patent [19]

Pantry et al.

[11] Patent Number: 4,612,542
[45] Date of Patent: Sep. 16, 1986

[54] APPARATUS FOR ARBITRATING BETWEEN A PLURALITY OF REQUESTOR ELEMENTS

[75] Inventors: William J. Pantry, Portland, Oreg.; Burke B. Baumann, Glendale, Ariz.

[73] Assignee: Honeywell Inc., Phoenix, Ariz.

[21] Appl. No.: 684,312

[22] Filed: Dec. 20, 1984

[51] Int. Cl.$^4$ .............................................. H04Q 9/00
[52] U.S. Cl. ................................. 340/825.5; 307/243; 340/825.03
[58] Field of Search ........... 340/825.5, 825.51, 825.03; 328/152; 307/243; 370/85

[56] References Cited

U.S. PATENT DOCUMENTS

| 4,016,539 | 4/1977 | Nanya | 340/825.5 |
| 4,189,766 | 2/1980 | Horiguchi et al. | 340/825.5 |
| 4,423,384 | 12/1983 | De Bock | 340/825.51 |
| 4,472,712 | 9/1984 | Ault | 340/825.5 |
| 4,546,450 | 10/1985 | Kanuma | 340/825.51 |

*Primary Examiner*—Donald J. Yusko
*Attorney, Agent, or Firm*—A. A. Sapelli; J. S. Solakian; A. Medved

[57] ABSTRACT

An arbitration circuit comprises a plurality of enabling elements which determines when predetermined conditions exist to transmit a request signal. A first gate combines transmitted request signals to generate a combined request signal. A plurality of first latches, each first latch having a sequential priority order and operatively connected to a corresponding enabling element, and further connected to the output of the first gate, generates an enable and a disable signal. A plurality of second gates is included, each second gate is operatively connected to the first gate to receive the combined request signal, and each second gate operatively connected to the corresponding first latch to receive the enable signal. Further, each of the second gates is operatively connected to each first latch having a higher sequential priority to receive the disable signal from each of the higher sequential priority first latches, each of the second gates generating a select control signal corresponding to the request signal selected by the arbitration circuit, thereby permitting a requestor access to the bus.

8 Claims, 9 Drawing Figures

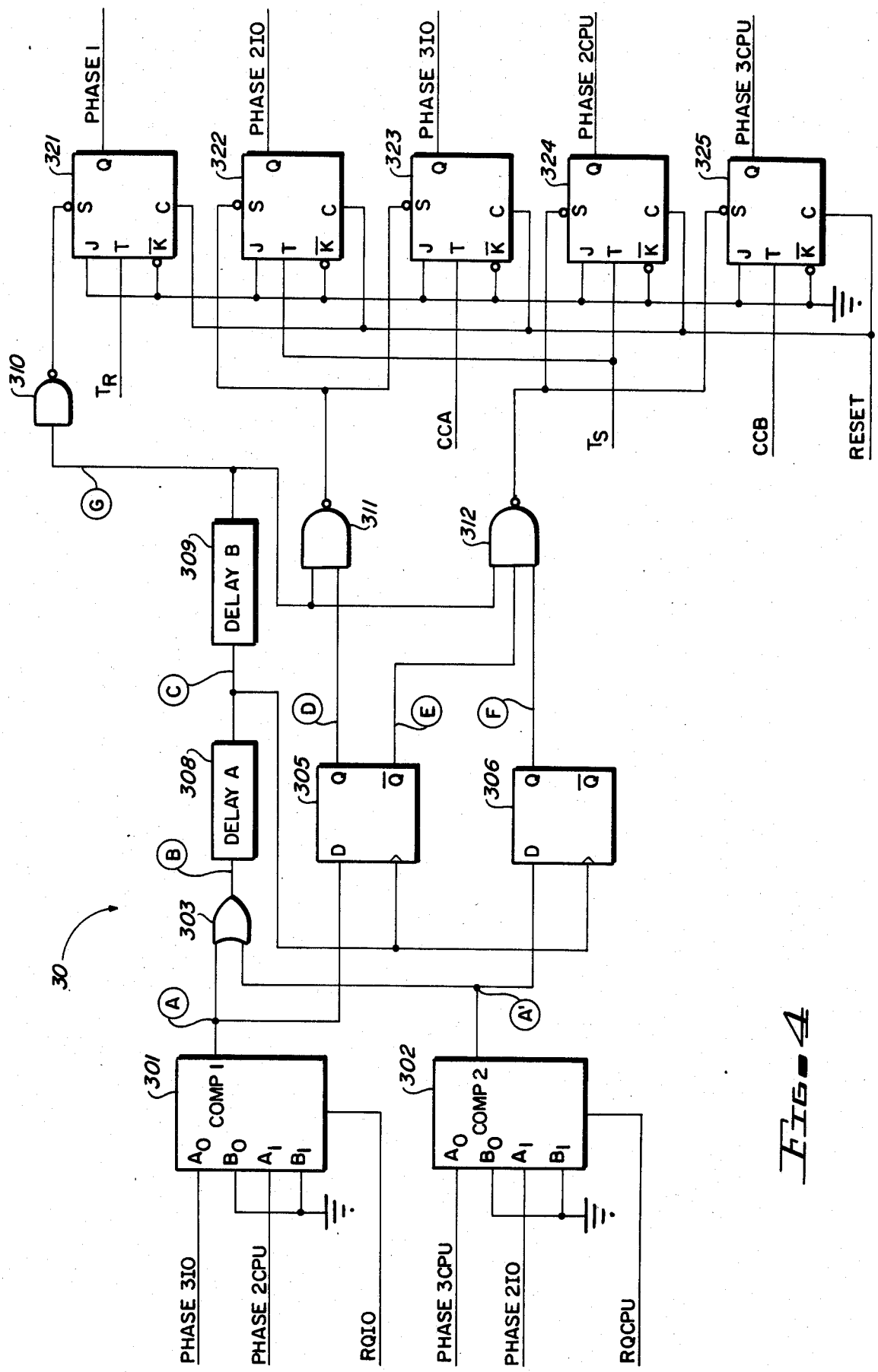

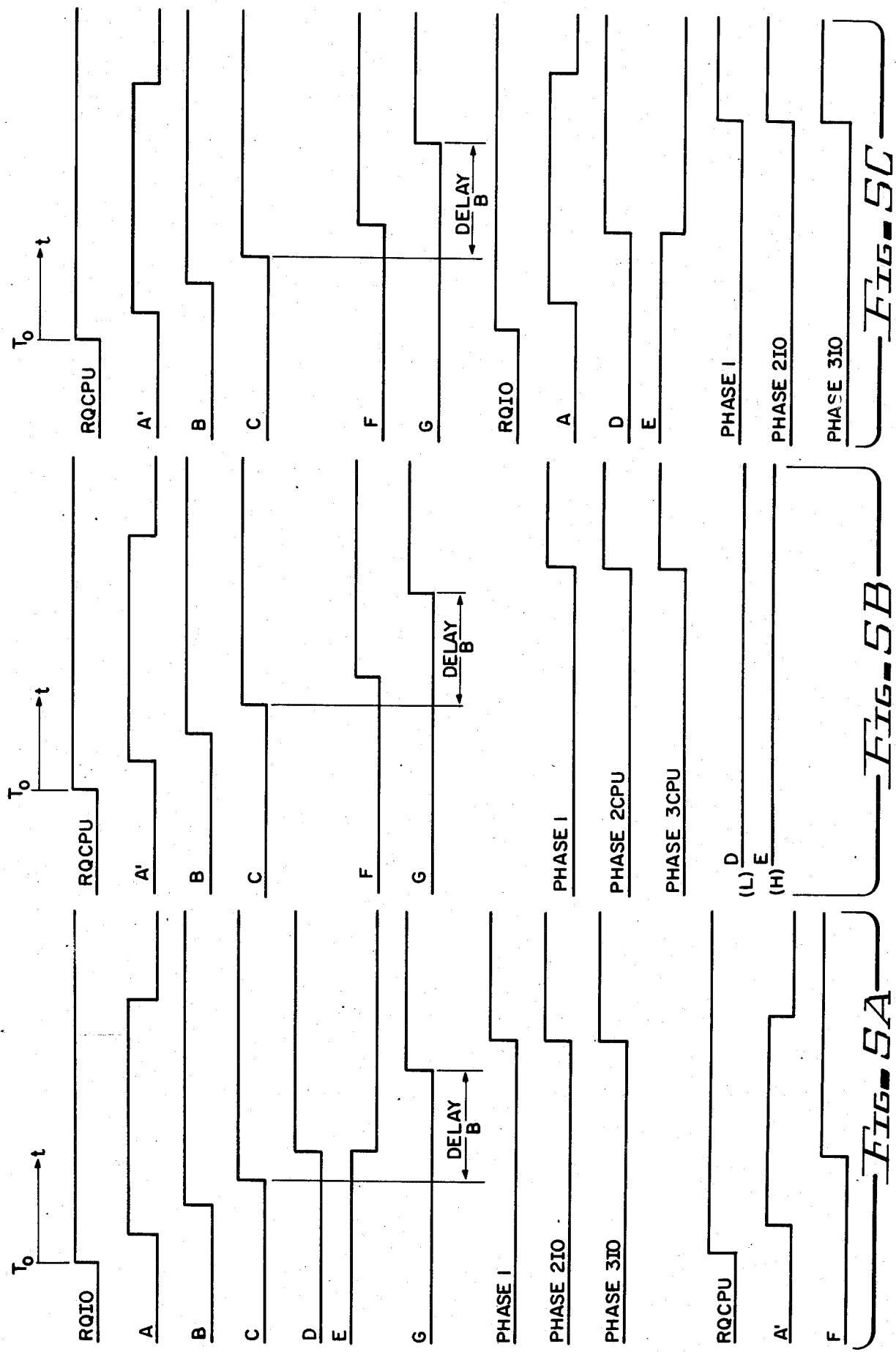

APPARATUS FOR ARBITRATING BETWEEN A PLURALITY OF REQUESTOR ELEMENTS

RELATED APPLICATION

The present patent application is related to U.S. patent application, Ser. No. 684,325, entitled "Dual Bus System," by B. B. Baumann and W. J. Pantry, filed on even date herewith, assigned to Honeywell Inc., the assignee of the present application, and is incorporated by reference herein.

BACKGROUND OF THE INVENTION

This invention relates, generally, to digital logic circuits and, in particular, to an arbitration circuit.

Digital logic circuitry finds a variety of uses in digital computers and digital systems. Digital circuits which can be defined in one of two logic states can be used to indicate system-level-states, such as the occurrence/-non-occurrence of an event, or the busy/ready status of a resource.

In asynchronous systems, various sub-systems must interact at times, e.g., a request for access to a bus or a memory access, and a decision as to which sub-system request occurs first, or should be given priority, must be made. For proper system operation, it is essential that the correct decision be made consistently and reliably. An error in the decision may result in allowing two peripheral units simultaneous access to a memory or simultaneous access to a system bus.

Thus, arbitration logic circuts are implemented in an attempt to avoid erroneous decisions which can result in the problems mentioned above, mainly two sub-systems given access to a bus or allowed access to a memory sub-system. Hence, it is highly desirable to provide an arbitration circuit which is simple, reliable, and arbitrates in a very short time between simultaneous or near simultaneous requests for access to a memory bus. The present invention implements an arbitration circuit which achieves the desired speed, reliability and simplicity features utilizing common digital circuits.

SUMMARY OF THE INVENTION

Therefore there is supplied by the present invention an arbitration circuit, for determining which one of a plurality of request signals from a plurality of requestors is to be acknowledged and granted access to a bus having an associated bus controller. The arbitration circuit of the present invention comprises a plurality of enabling elements, each enabling element having an input terminal adapted to receive one of the request signals, for determining when predetermined conditions exist to transmit the request signal. A first gate element is included which is operatively connected to each of the plurality of enabling elements for combining transmitted request signals to generate a combined request signal. Also included is a plurality of first latch element, each of the first latch elements having a sequential priority order and operatively connected to a corresponding enabling element, and further connected to the output of the first gate element. Each of the first latch elements generates an enable signal and a disable signal. A plurality of second gate elements is included, whereby each of the second gate element is operatively connected to the first gate elements to receive the combined request signal, and each of the second gate elements is operatively connected to the corresponding first latch elements to receive the enabling signal. Further each of the second gate elements is operatively connected to each first latch elements having a higher sequential priority to receive the disabling signal from each of the higher sequential priority first latch elements, each of the second gate elements generating a select control signal corresponding to the request signal selected by the arbitration circuit thereby permitting that requestor access to the bus.

Accordingly, it is an object of the present invention to provide a reliable arbitration circuit by permitting no more than one requestor to have access to a resource during the same time period.

This and other objects of the present invention will become more apparent when taken in conjunction with the following description and attached drawings, wherein like characters indicate like parts and which drawings form a part of the present application.

BRIEF DESCRIPTION OF THE DRAWINGS

FIG. 4 shows a logic diagram of the arbitration circuit of the preferred embodiment of the present invention;

FIGS. 5A, 5B, and 5C, which taken together comprise FIG. 5, shows the various waveforms of the logic diagram of the arbitration circuit of FIG. 4, for three different timing conditions of the request signals; FIG. 6, shows a logic diagram of an arbitration circuit having three requestors.

DETAILED DESCRIPTION

Figure 1:
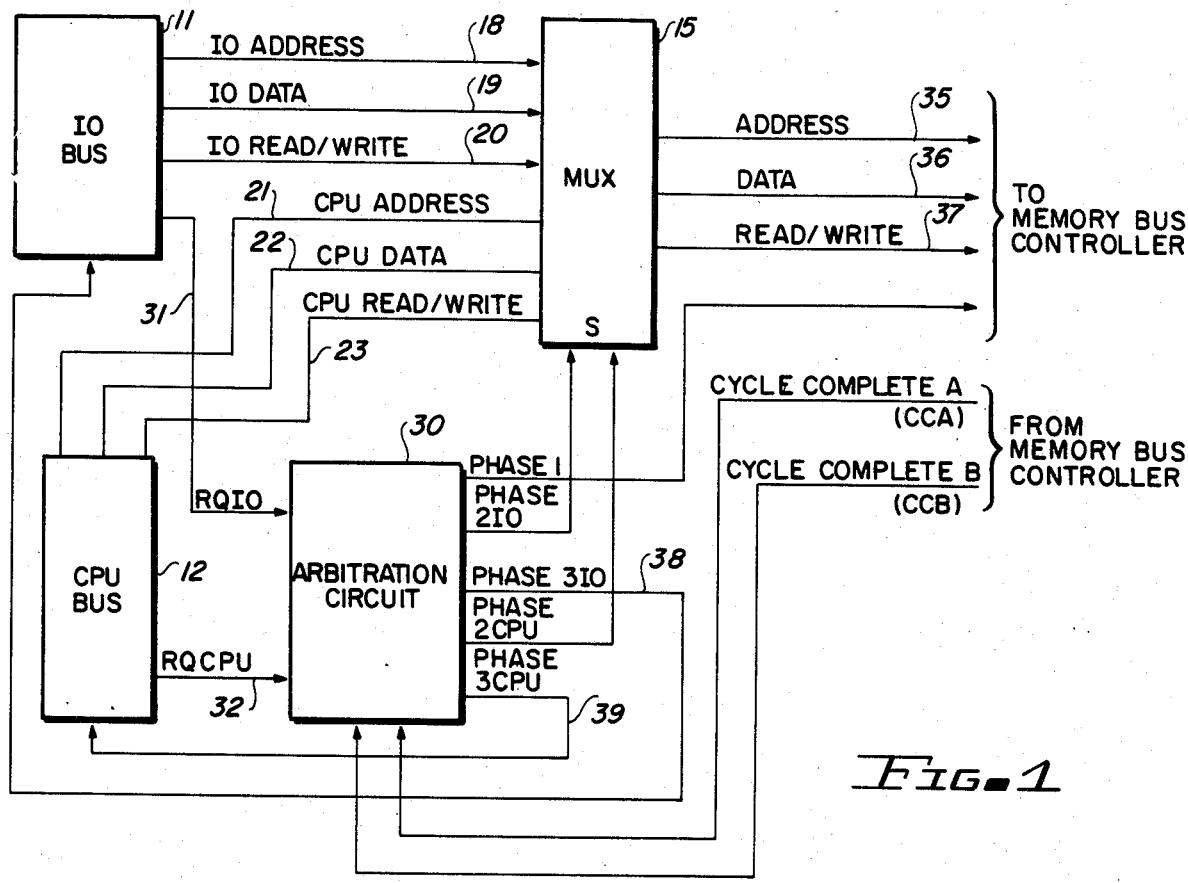
FIG. 1 shows a block diagram of a system which utilizes an arbitration circuit of the present invention.

Referring to FIG. 1, a block diagram is shown of a system which utilizes an arbitration circuit of the present invention. The system of FIG. 1 shows a two bus system, designated IO BUS 11 and CPU BUS 12. A plurality of the devices (not shown) coupled to the IO BUS 11 desires to inteface with a memory via a memory bus (not shown). Likewise, a plurality of devices (not shown) coupled to the CPU BUS 12 desires to interface with a memory via the memory bus (not shown) having an associated memory bus controller (not shown). Both the IO BUS 11 and CPU BUS 12 can include a bus controller for resolving which of the devices attached thereto will have access to the respective buses. The details of the operation of the bus and the bus controller are not necessary for an understanding of the present invention and will not be discussed further herein.

The IO BUS 11 is operatively connected to a multiplexer (MUX) 15 via an IOADDRESS line 18, an IODATA line 19, and an I/O read/write line 20. The CPU BUS 12 is operatively connected to the MUX 15 via a CPUADDRESS line 21, a CPUDATA line 22, and a CPU read/write line 23. When (a device coupled to) the IO BUS 11 desires to communicate with the memory (not shown) a request is made to an arbitration circuit 30 via the RQIO line 31. When (a device coupled to) the CPU BUS 12 desires to communicate with a memory (not shown) a request is made to the arbitration circuit 30 via the RQCPU line 32.

The arbitration circuit 30 will grant a request to access memory by generating a phase 1, phase 2, and phase 3 signals corresponding to either the IO BUS 11 or the CPU BUS 12. The phase 1 signal is coupled to the memory bus controller (not shown) to indicate a memory cycle request has been initiated and allows the memory to set up its logic for the memory cycle. The phase 2 signals (PHASE2IO, PHASE2CPU) are coupled to the MUX 15 to perform the selection function (S), thereby selecting the address and/or data from either the IO BUS 11 or CPU BUS 12, the selected address and data being transmitted to the memory bus controller (not shown) via the ADDRESS and DATA lines 35, 36 (or data returned for a memory read operation), and the selected read/write operation is transmitted to the memory bus controller (not shown) via read/write line 37. The phase 3 signal is transmitted back to the respective bus, PHASE3IO signal being transmitted to the IO BUS 11 via PHASE3IO line 38, and the PHASE3CPU signal being transmitted to the CPU BUS 12 via the PHASE3CPU line 39. When the requests are made to the arbitration circuit 30 in a simultaneous or near simultaneous time frame, the arbitration circuit 30 will resolve the timing of the request and permit only one bus to have access to the memory. When the memory cycle initiated by the IO BUS 11 is completed, the memory bus controller (not shown) transmits a cycle complete A (CCA) signal back to the arbitration circuit 30. Likewise, when the memory cycle initiated by the CPU BUS 12 is completed, the memory bus controller (not shown) transmits a cycle complete B (CCB) signal back to the arbitration circuit 30.

Figure 2:
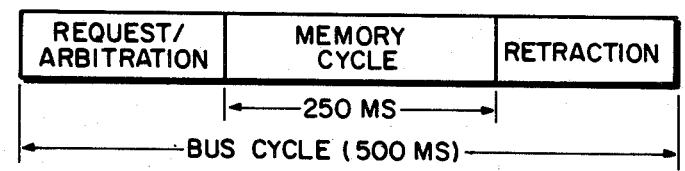
FIG. 2 shows a timing diagram of a bus cycle interacting with a memory bus.

Referring to FIG. 2, a timing diagram of a bus cycle interacting with the memory bus/memory is shown. A bus cycle is divided into three parts comprising request/arbitration, memory cycle, and retraction. The first part is the request/arbitration. When a bus requests communication with the memory unit, the arbitration circuit 30 responds to the request and allows the communication to proceed. If two (or more) requests are made, the arbitration circuit will resolve the conflict. If the requests are made simultaneously or nearly simultaneously, then the resolution is made on a priority basis. Otherwise, the arbitation circuit 30 determines which bus made the request first and permits the bus making the first request to communicate with the memory unit. (Although the following description centers on the request being made from two buses, it will be understood that the arbitration can be made between three or more buses without departing from the spirit and scope of the invention described herein.)

The second part of the bus cycle is the memory cycle. This is the time in which the memory is performing the actual reading or writing. The third part of the bus cycle is the retraction. This includes any post memory cycle activity formed by the bus interface unit which includes error correction and detection functions, parity checking, etc. Typical values for the memory cycle of the present invention is 250 nano seconds and a typical value for the bus cycle of the present invention is 500 nano seconds.

Figure 3:
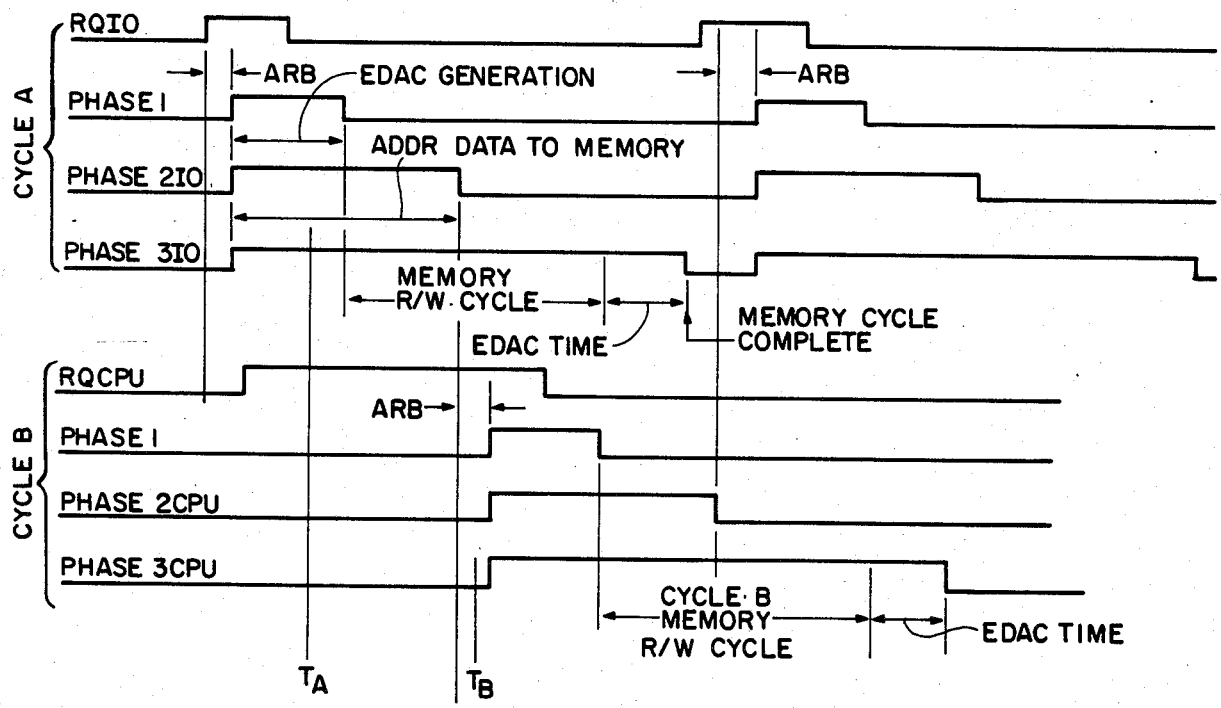
FIG. 3 shows a timing diagram of the arbitration circuit of the preferred embodiment of the present invention.

Referring to FIG. 3, a timing diagram of the arbitrator circuit 30 is shown. When a request is made by the IO BUS 11, request signal RQIO is raised. For purposes of example only, shortly thereafter, assume a request is made from the CPU BUS 12, and request signal RQCPU is raised. The arbitration takes place (ARB) and the request is granted to the IO BUS 11. The phase 1 signal is raised, and the phase 2 and the phase 3 signals are raised for the IO BUS 11, PHASE1, PHASE2IO, and PHASE3IO, respectively. During phase 1, write data is latched from the appropriate requestor. In the preferred embodiment error detection and correction (EDAC) check-bit generation occurs for write request operations, and some internal checking of address, read/write, etc. is performed. During phase 1, (PHASE2IO), address and read/write setup and hold time occurs on the bus. The phase 3 signal indicates a cycle is in process. Since phase 3 is transmitted back to the bus (PHASE3IO TO BUS 11), the bus knows the request has been acknowledged and lowers the request signal RQIO. The memory cycle begins with the end of phase 1. The end of the memory cycle corresponds with the begining of EDAC time, which can also be considered as phase 4. EDAC time (or phase 4) routes the read data to the appropriate requestor and an EDAC check-bit comparison is performed for a read operation. At the completion of phase 2, the arbitration function (ARB) occurs again and the request pending from the CPU BUS 12 is acknowledged. The phase 1, phase 2, and phase 3 signals for the CPU BUS 12 are raised, PHASE1, PHASE2CPU, and PHASE3CPU, respectively. At the completion of the PHASE3IO signal, the lowering of the phase 3 signal indicates to the IO BUS 11 that the operation to the memory unit is complete (denoted in FIG. 3 as memory cycle complete).

Cycle B cannot begin until the end of cycle A phase 2. Cycle A phase 4 cannot begin until the end of cycle B phase 1. Cycle A cannot begin until the end of cycle B phase 2. Cycle B phase 4 cannot begin until the end of cycle A phase 1. From this one can see that phase 1 and phase 4 are always mutually exclusive (non-overlapping). Phase 2 of cycle A and phase 2 of cycle B are always mutually exclusive (non-overlapping). Phase 3 of cycle A and phase 3 of cycle B can and do overlap. The arbitration period for cycle B (phase 1, phase 2 and phase 3) can only begin when cycle A phase 2 has ended. The arbitration period for cycle A (phase 1, phase 2 and phase 3) can only begin when cycle B phase 2 has ended.

Referring to FIG. 4, the logic diagram of the arbitration circuit 30 is shown. A first and second comparator (COMP1, COMP2) 301, 302 are utilized to determine if a request signal is to be accepted. Request signal RQIO enables COMP1 301 and request signal RQCPU enables COMP2 302. The comparators 301, 302 determine the condition upon which a request will be accepted. If a phase 2 signal is high for the other requestor bus, then a no compare condition exists and the comparator will not pass the request signal. For example, referring to FIG. 3, at time $T_a$, PHASE2IO is high so COMP2 302 will not pass the request signal RQCPU. At time $T_b$, PHASE2IO is low and PHASE3CPU is low, generating a compare condition and hence a request signal RQCPU is outputted from COMP2 302. If a request signal RQIO existed at time $T_a$, COMP1 301 would not pass the request signal RQIO, since PHASE3IO is high at this time because all the bus functions are not completed.

Referring back to FIG. 4, the output COMP1 301 is coupled to OR-gate 303 and to a corresponding D-type flip-flop 305. The output of COMP2 302 is coupled to the OR-gate 303 and to a D-type flip-flop 306. The output of OR-gate 303 is coupled to a first delay, delay A, 308 and the output of delay A 308 is coupled to a second delay, delay B, 309 and is also coupled to the clock input of the D-type flip-flops 305, 306. Five J-K type flip-flops comprise the PHASE1 flip-flop 321, PHASE2IO flip-flop 322, PHASE3IO flip-flop 323, PHASE2CPU flip-flop 324, and PHASE3CPU flip-flop 325. The output of delay B 309 is coupled to a transmission gate (sometimes referred to herein as a driver) 310 which is coupled to the set input of PHASE1 flip-flop 321. The output of delay B 309 is also coupled to an input of NAND GATE 311 and NAND GATE 312. The Q output of D type flip-flop 305 is coupled to NAND GATE 311. A Q bar output of D type flip-flop 305 is coupled to NAND GATE 312, and the Q output of D-type flip-flop 306 is coupled to NAND GATE 312. The output of NAND GATE 311 is coupled to the set input of PHASE2IO flip-flop 322 and to the set input of PHASE3IO flip-flop 323. The output of NAND GATE 312 is coupled to the set input of PHASE2CPU flip-flop 324 and to the set input of PHASE3CPU flip-flop 325. The J-K input of the five J-K type flip-flops are connected to ground, or a logic 0, and the clear input of the five J-K type flip-flops are connected to a system reset (RESET). The T input of PHASE1 flip-flop 321 is connected to a timer $T_r$ which resets the flip-flop. The T input of PHASE2IO flip-flop 322 is coupled to a second timer $T_s$ and the T input of the PHASE2CPU flip-flop 324 is also connected to the $T_s$ timer. This timer, $T_s$ (not shown), is initiated at the time the PHASE1 flip-flop 321 is reset and the time out occurs at a predetermined time yielding the wave form as shown in FIG. 3, the time being selected to give a required amount of time to perform the desired function. When the timer times out the respective flip-flop is reset. The T input of PHASE3IO flip-flop 323 receives the cycle complete A (CCA) and the T input of the PHASE3CPU flip-flop 325 receives the cycle complete B signal (CCB) from the memory bus controller.

The operation of the arbitration circuit 30 will now be described in conjunction with FIG. 5A, 5B, and 5C, which taken together comprise FIG. 5. FIG. 5A shows a request RQIO being made at time $T_0$, and request RQCPU being made a short time thereafter. The output of COMP1 301 (waveform A) is shown delayed by the operation of COMP1 301. (For purposes of example only the delays shown herein are representative and are shown to be essentially equal for each element of arbitation circuit 30.) The output of OR-gate 303 (waveform B) is shown delayed to include the proprogation time through OR-gate 303, and the output of delay A 308 (waveform C) is shown again delayed by the delay time of the delay A 308 (in the preferred embodiment the delay is to exceed the setup time requirements of the D-type flip-flops 305, 306). Since the D input to flip-flop 305 is high as a result of waveform A, when the clock input goes high, the D-type flip-flop 305 is set and Q output (waveform D) goes high, and conversely the Q bar output goes low (waveform E). NAND GATE 311 is partially qualified by the output signal of D-type flip-flop 305. The output of delay B 309, which in the preferred embodiment is to exceed the metastable time of the D-type flip-flops 305, 306, is a combined request signal which indicates a request is in progress. When the combined request signal of delay B 309 is outputted (waveform G), NAND GATE 311 is qualified setting the PHASE2IO and PHASE3IO flip-flops thereby outputting the PHASE2IO and the PHASE3IO signal enabling the communication path from the IO BUS to the MEMORY BUS, effectively acknowledging the RQIO request. When the combined request signal of delay B 309 is outputted (waveform G), transmission gate 310 sets PHASE1. The Q bar output of D-type flip-flop 305 disables NAND GATE 312 so that when the output of D-type flip-flop 306 is set (waveform F), the effect of this signal is nullified by the Q bar output of D-type flip-flop 305 to NAND GATE 312. Note that the output of COMP2 302 will go high (waveform A') since PHASE3CPU and PHASE2IO are both low at this time.

FIG. 5B shows the wave forms of the various signals through arbitration circuit 30 when a request signal is made from the CPU BUS. In this case the output of COMP2 302 goes high after the request is made and likewise the output of OR-gate 303 (waveform B) goes high and when the output of delay A 308 (waveform C) goes high D-type flip-flop 306 is set resulting in the Q output of D-type flip-flop 306 going high (waveform F) which partially enables NAND GATE 312. Since D type flip-flop 305 is not set, the Q bar output (waveform E) is high further partially enabling NAND GATE 312. When the combined request signal is outputted from delay B 309 (waveform G) NAND GATE 312 is completely enabled thereby setting PHASE2CPU flip-flop 324 and PHASE3CPU flip-flop 325 generating the respective phase 2 and phase 3 signals thereby granting the MEMORY BUS access to the CPU BUS. When the combined request signal delay B 309 is outputted (waveform G), transmission gate 310 sets PHASE1.

FIG. 5C shows a near simultaneous request between the request signals from the CPU BUS 12 and IO BUS 11. At time $T_0$, RQCPU goes high resulting in the output of COMP2 302 (waveform A') going high, the output of OR-gate 303 (waveform B) going high, and the output of delay A 308 (waveform C) going high. When waveform C goes high, since the D input to D-type flip-flop 306 is high (waveform A'), the Q output of D-type flip-flop 306 goes high also (waveform F), partially enabling NAND GATE 312. The output of delay B 309 (waveform G) is essentially that of the waveform C delayed by the delay time of delay B 309. The request from the IO BUS RQIO occurs a short time after the request from the CPU BUS. Since neither PHASE3IO nor PHASE3CPU are high, or logic one, shortly after time $T_0$, COMP1 301 is qualified resulting in a request signal RQIO being transmitted (waveform A). Since the D input of D-type flip-flop 305 is high at the time when the waveform C signal goes high (the clock input to D-type flip-flop 305) D-type flip-flop 305 is set resulting in the Q output of D-type flip-flop 305 (waveform D) going high and conversely the Q bar output of D-type flip-flop 305 being reset, or going low, (waveform E). The Q bar output of D-type flip-flop 305 (waveform E disables NAND GATE 312. The Q output of D-type flip-flop 305 (waveform D) partially enables NAND GATE 311, so that when the signal of waveform G goes high NAND GATE 311 is enabled resulting in the request being granted to the IO BUS, shown in FIG. 5C as the PHASE2IO and PHASE3IO signals going high. Thus, in this case, even though the request signal RQIO was made shortly after the request signal from the CPU BUS, the request from the IO BUS was granted first as a matter of priority. Anytime between $T_0$ and $T_x$ is the simultaneous or near simultaneous occurrence of the request. If the RQIO signal occurs at or after time $T_x$, then the signal of waveform A will not be present at D-type flip-flop 305 so that the waveform C will not cause a change in state of the D-type flip-flop 305 and NAND GATE 311 will not be enabled nor will NAND GATE 312 be disabled.

Figure 6A:
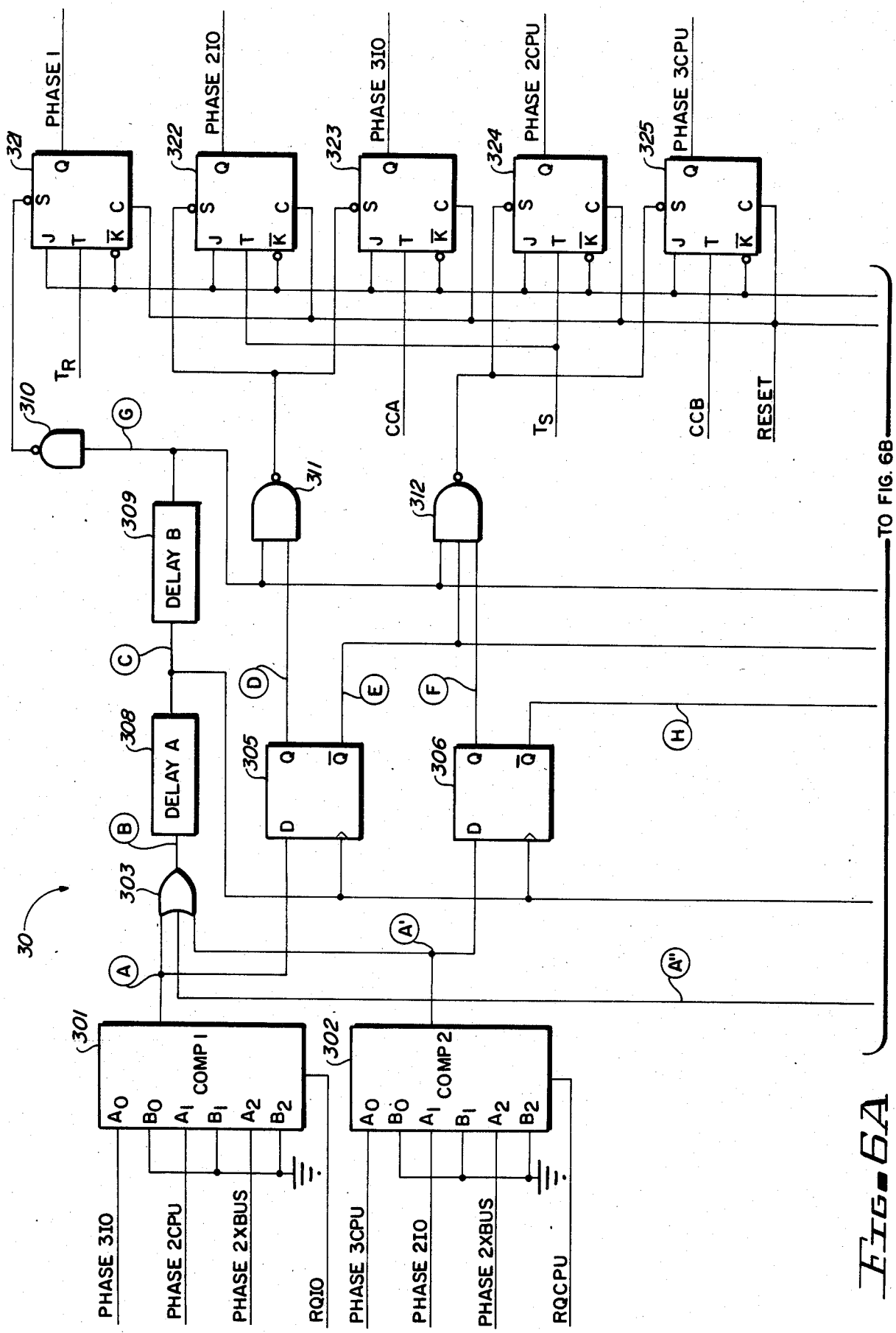
FIG. 6A and 6B, taken together comprise
Figure 6B:
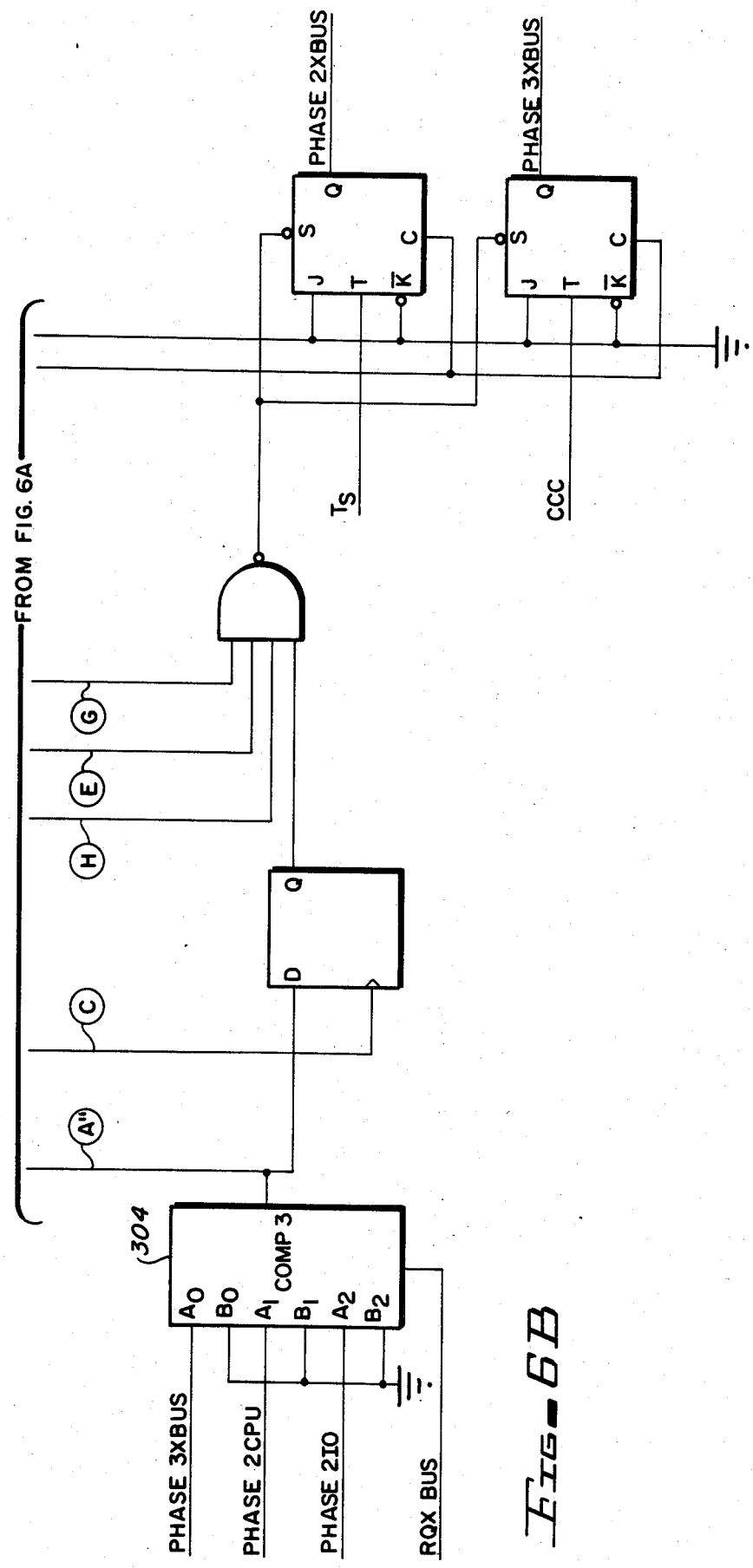

FIG. 6 (comprised of FIG. 6A and 6B) shows an alternative embodiment of the present invention having three requestors, the CPU bus, the IO bus, and a third bus, XBUS. The conditions of the comparators 301, 302, and 304 include the condition for when the third bus can be granted access to the memory unit. It will be understood by those skilled in the art that additional conditions may be added to the comparators when it is desired to prevent transmission of the request.

While there has been shown what is considered to be the preferred embodiment of the invention, it will be manifest that many changes and modifications can be made therein without departing from the essential spirit and scope of the invention. It is intended, therefore, in the annexed claims, to cover all such changes and modifications which fall within the true scope of the invention.

We claim:

1. An arbitration circuit, for determining which one of a plurality of request signals from a plurality of requestors is to be acknowledge and granted access to a bus having an associated bus controller, comprising:
   (a) a plurality of enabling means, each enabling means having an input terminal adapted to receive one of said request signals, for determining when predetermined conditions exist to transmit the request signal;
   (b) first gate means, operatively connected to each of said plurality of enabling means, for combining transmitted request signals to generate a combined request signal;
   (c) a plurality of first latch means, each of said first latch means having a sequential priority order and operatively connected to a corresponding enabling means, and further connected to the output of said first gate means, each of said first latch means for generating an enable signal and a disable signal; and
   (d) a plurality of second gate means, each of said second gate means operatively connected to said first gate means to receive said combined request signal, and each of said second gate means operatively connected to the corresponding first latch means to receive the enabling signal, and further each of said second gate means operatively connected to each first latch means having a higher sequential priority to receive the disabling signal from each of said higher sequential priority first latch means, each of said second gate means for generating a select control signal corresponding to the request signal selected by the arbitration circuit thereby permitting that requestor access to the bus.

2. An arbitration circuit, according to claim 1, further comprising:
   a plurality of second latch means, operatively connected to a corresponding second gate means, for maintaining a phase 2 signal to provide for interfacing control information with the bus, including address and read/write setup and hold.

3. Ar arbitration circuit, according to claim 2, further comprising:
   a plurality of third latch means, operatively connected to a corresponding second gate means, for maintaining a phase 3 signal to provide a cycle in process indication.

4. An arbitration circuit, according to claim 3, wherein each of said second latch means having an output terminal adapted to transmit said select control signal thereby permitting the requestor to communicate with said bus, and further each of said second latch means operatively connected to said bus controller to receive a time-out signal, whereupon said select control signal is removed.

5. An arbitration circuit, according to claim 4, wherein each of said third latch means is operatively connected to a corresponding requestor, and further, each of said third latch means having a terminal adapted to receive a cycle-complete signal thereby removing said cycle control signal upon completion of post bus cycle activity.

6. An arbitration circuit, according to claim 5, further comprising:
   driver means, operatively connected to said first gate means, for transmitting said combined request signal to the bus controller to indicate the start of the access.

7. An arbitration circuit, according to claim 6, further comprising:
   fourth latch means, operatively connected to said driver means, for maintaining said combined request signal.

8. An arbitration circuit, according to claim 7, wherein said first gate means comprises:
   (a) OR-gate means, operatively connect to each of said plurality of enabling means, for combining transmitted request signals to generate a combined request signal;
   (b) first delay means, operatively connected to said OR-gate means, for delaying the transmission of said combined request signal a predetermined time; and
   (c) second delay means, operatively connected to said first delay means, for delaying the transmission of said combined request signal a predetermined time.

* * * * *